United States Patent
Maslekar et al.

(10) Patent No.: US 10,989,427 B2
(45) Date of Patent: Apr. 27, 2021

(54) HVAC SYSTEM INCLUDING SMART DIAGNOSTIC CAPABILITES

(71) Applicant: Trane International Inc., Davidson, NC (US)

(72) Inventors: Prerana Maslekar, Austin, TX (US); Mageshkumar Muthuswamy, Chennai (IN); Carl L Garrett, Tyler, TX (US)

(73) Assignee: Trane International Inc., Davidson, NC (US)

( * ) Notice: Subject to any disclaimer, the term of this patent is extended or adjusted under 35 U.S.C. 154(b) by 474 days.

(21) Appl. No.: 15/848,250

(22) Filed: Dec. 20, 2017

(65) Prior Publication Data

US 2019/0186766 A1   Jun. 20, 2019

(51) Int. Cl.
G05B 15/02 (2006.01)
G05B 19/04 (2006.01)
(Continued)

(52) U.S. Cl.
CPC .............. *F24F 11/30* (2018.01); *F24F 11/32* (2018.01); *F24F 11/38* (2018.01); *F24F 11/49* (2018.01); *F24F 11/56* (2018.01); *F24F 11/58* (2018.01); *F24F 11/61* (2018.01); *F24F 11/64* (2018.01); *G05B 15/02* (2013.01); *G05B 19/048* (2013.01); *F24F 11/50* (2018.01); *F24F 2140/00* (2018.01);
(Continued)

(58) Field of Classification Search
CPC .......... F24D 11/30; F24D 11/56; F24D 11/58; F24D 11/61; F24D 11/32; F24D 11/38; F24D 11/64; F24D 11/49; F24D 11/50; F24D 2140/00; G05B 19/048; G05B 15/02; G05B 2219/2614; G05B 2219/24048; G05B 2219/2642
See application file for complete search history.

(56) References Cited

U.S. PATENT DOCUMENTS 5,694,109 A   12/1997   Nguyen et al.
5,729,474 A   3/1998    Hildebrand et al.
(Continued)

FOREIGN PATENT DOCUMENTS

WO   WO2014186748   * 11/2014

OTHER PUBLICATIONS

Aspey, S., "Optimize Building Performance with BAS Troubleshooting", Oct. 8, 2015, Contracting Business, Retrieved from the Internet on Jan. 20, 2020 at "www.contractingbusiness.com". (Year: 2015).*

(Continued)

*Primary Examiner* — Mohammad Ali
*Assistant Examiner* — Kelvin Booker
(74) *Attorney, Agent, or Firm* — Womble Bond Dickinson (US) LLP

(57) ABSTRACT

A system for remote diagnostic analysis of a heating, ventilation and air condition (HVAC) system is provided. The system includes a thermostat in operable communication with at least one peripheral component of the HVAC system and configured to receive information relating to the at least one peripheral component, and a server in operable communication with the thermostat for receiving and analyzing the information. The server causes the at least one peripheral component to conduct a diagnostic test and analyzes the test result to perform a root cause analysis of a system malfunction.

22 Claims, 3 Drawing Sheets

(51) Int. Cl.
*F24F 11/30* (2018.01)
*F24F 11/32* (2018.01)
*F24F 11/49* (2018.01)
*F24F 11/50* (2018.01)
*F24F 11/38* (2018.01)
*F24F 11/64* (2018.01)
*F24F 11/56* (2018.01)
*F24F 11/58* (2018.01)
*F24F 11/61* (2018.01)
*G05B 19/048* (2006.01)
*F24F 140/00* (2018.01)

(52) U.S. Cl.
CPC .............. *G05B 2219/24048* (2013.01); *G05B 2219/2614* (2013.01)

(56) References Cited

U.S. PATENT DOCUMENTS

| | | | |
|---|---|---|---|
| 6,147,601 A | 11/2000 | Sandelman et al. |
| 6,211,782 B1 | 4/2001 | Sandelman et al. |
| 6,385,510 B1 | 5/2002 | Hoog et al. |
| 6,453,687 B2 | 9/2002 | Sharood et al. |
| 6,462,654 B1 | 10/2002 | Sandelman et al. |
| 6,535,123 B2 | 3/2003 | Sandelman et al. |
| 6,553,336 B1 | 4/2003 | Johnson et al. |
| 6,772,096 B2 | 8/2004 | Murakami et al. |
| 6,850,252 B1 * | 2/2005 | Hoffberg ............ G06K 9/00369 348/E7.061 |
| 6,851,621 B1 * | 2/2005 | Wacker .............. G05D 23/1905 236/51 |
| 6,853,882 B2 | 2/2005 | Dudley |
| 6,889,173 B2 | 5/2005 | Singh |
| 6,891,838 B1 | 5/2005 | Petite et al. |
| 6,943,681 B2 | 9/2005 | Rezvani et al. |
| 6,955,302 B2 * | 10/2005 | Erdman, Jr. ......... F24F 11/0086 236/51 |
| 6,956,463 B2 | 10/2005 | Crenella et al. |
| 7,081,827 B2 | 7/2006 | Addy |
| 7,092,794 B1 | 8/2006 | Hill et al. |
| 7,139,564 B2 | 11/2006 | Hebert |
| 7,142,123 B1 | 11/2006 | Kates |
| 7,156,316 B2 | 1/2007 | Kates |
| 7,163,156 B2 | 1/2007 | Kates |
| 7,163,158 B2 | 1/2007 | Rossi et al. |
| 7,168,627 B2 | 1/2007 | Kates |
| 7,168,632 B2 | 1/2007 | Kates |
| 7,174,239 B2 | 2/2007 | Butler et al. |
| 7,183,899 B2 | 2/2007 | Behnke |
| 7,200,524 B2 | 4/2007 | Kang et al. |
| 7,222,048 B2 | 5/2007 | Petchenev et al. |
| 7,228,726 B2 | 6/2007 | Kates |
| 7,230,528 B2 | 6/2007 | Kates |
| 7,274,973 B2 * | 9/2007 | Nichols .................. G05B 15/02 700/276 |
| 7,275,377 B2 | 10/2007 | Kates |
| 7,286,056 B2 | 10/2007 | Kates |
| 7,296,426 B2 | 11/2007 | Butler et al. |
| 7,299,034 B2 | 11/2007 | Kates |
| 7,308,384 B2 | 12/2007 | Shah et al. |
| 7,336,168 B2 | 2/2008 | Kates |
| 7,356,473 B2 | 4/2008 | Kates |
| 7,372,003 B2 | 5/2008 | Kates |
| 7,383,158 B2 | 6/2008 | Krocker et al. |
| 7,389,806 B2 | 6/2008 | Kates |
| 7,400,942 B2 | 7/2008 | Cheng |
| 7,411,497 B2 | 8/2008 | Kates |
| 7,424,867 B2 | 9/2008 | Kates |
| 7,434,744 B2 | 10/2008 | Garozzo et al. |
| 7,451,606 B2 | 11/2008 | Harrod |
| 7,461,343 B2 | 12/2008 | Kates |
| 7,496,472 B2 | 2/2009 | Seem |
| 7,505,914 B2 | 3/2009 | McCall, Jr. |
| 7,528,711 B2 | 5/2009 | Kates |
| 7,536,276 B2 | 5/2009 | Pearson |
| 7,590,469 B2 | 9/2009 | Grohman |
| 7,590,499 B2 | 9/2009 | Ha et al. |
| 7,594,106 B2 | 9/2009 | Smith et al. |
| 7,617,799 B2 | 11/2009 | Kates |
| 7,658,336 B2 | 2/2010 | Kates |
| 7,669,461 B2 | 3/2010 | Kates |
| 7,702,421 B2 | 4/2010 | Sullivan, Jr. et al. |
| 7,764,171 B2 | 7/2010 | Cheng |
| 7,775,452 B2 | 8/2010 | Shah et al. |
| 7,777,159 B2 | 8/2010 | Ho |
| 7,787,994 B2 | 8/2010 | Wacker |
| 7,841,542 B1 | 11/2010 | Rosen |
| 7,848,900 B2 | 12/2010 | Steinberg et al. |
| 7,849,698 B2 | 12/2010 | Harrod et al. |
| 7,908,117 B2 | 3/2011 | Steinberg et al. |
| 7,912,669 B2 | 3/2011 | Basu |
| 7,941,530 B2 | 5/2011 | Ha et al. |
| 7,948,833 B2 | 5/2011 | Ha et al. |
| 7,963,454 B2 | 6/2011 | Sullivan, Jr. et al. |
| 7,966,152 B2 | 6/2011 | Stluka et al. |
| 7,999,789 B2 | 8/2011 | Ha et al. |
| 8,000,385 B2 | 8/2011 | Wei et al. |
| 8,010,237 B2 | 8/2011 | Cheung et al. |
| 8,014,902 B2 | 9/2011 | Kates |
| 8,019,567 B2 | 9/2011 | Steinberg et al. |
| 8,020,777 B2 | 9/2011 | Kates |
| 8,027,742 B2 | 9/2011 | Seem et al. |
| 8,031,079 B2 | 10/2011 | Kates |
| 8,065,886 B2 | 11/2011 | Singh et al. |
| 8,090,477 B1 | 1/2012 | Steinberg |
| 8,090,676 B2 | 1/2012 | Patel et al. |
| 8,115,606 B2 | 2/2012 | Ha et al. |
| 8,121,818 B2 | 2/2012 | Gorinevsky |
| 8,123,571 B2 | 2/2012 | Brown et al. |
| 8,131,497 B2 | 3/2012 | Steinberg et al. |
| 8,134,454 B2 | 3/2012 | Ha et al. |
| 8,136,108 B2 | 3/2012 | Ha et al. |
| 8,154,398 B2 | 4/2012 | Rolf et al. |
| 8,160,729 B2 | 4/2012 | Ahmed |
| 8,160,752 B2 | 4/2012 | Weaver et al. |
| 8,174,483 B2 | 5/2012 | Cheng et al. |
| 8,180,492 B2 | 5/2012 | Steinberg |
| 8,195,313 B1 | 6/2012 | Fadell et al. |
| 8,196,185 B2 | 6/2012 | Geadelmann et al. |
| 8,239,066 B2 | 8/2012 | Jennings et al. |
| 8,239,922 B2 | 8/2012 | Sullivan, Jr. et al. |
| 8,260,444 B2 | 9/2012 | Kowald et al. |
| 8,280,536 B1 | 10/2012 | Fadell et al. |
| 8,291,524 B2 | 10/2012 | Leonard et al. |
| 8,316,658 B2 | 11/2012 | Singh et al. |
| 8,332,178 B2 | 12/2012 | Simons |
| 8,339,901 B2 | 12/2012 | Haupt et al. |
| 8,352,081 B2 | 1/2013 | Grohman |
| 8,376,242 B1 | 2/2013 | Uselton |
| 8,382,003 B2 | 2/2013 | Grohman |
| 8,396,678 B2 | 3/2013 | Davis |
| 8,406,162 B2 | 3/2013 | Haupt et al. |
| 8,412,488 B2 | 4/2013 | Steinberg et al. |
| 8,423,322 B2 | 4/2013 | Steinberg et al. |
| 8,447,541 B2 | 5/2013 | Rada et al. |
| 8,452,457 B2 | 5/2013 | Matsuoka et al. |
| 8,473,106 B2 | 6/2013 | Clark et al. |
| 8,478,447 B2 | 7/2013 | Fadell et al. |
| 8,479,689 B2 | 7/2013 | Pitonyak et al. |
| 8,489,243 B2 | 7/2013 | Fadell et al. |
| 8,498,753 B2 | 7/2013 | Steinberg et al. |
| 8,510,255 B2 | 8/2013 | Fadell et al. |
| 8,511,576 B2 | 8/2013 | Warren et al. |
| 8,523,083 B2 | 9/2013 | Warren et al. |
| 8,527,096 B2 | 9/2013 | Pavlak et al. |
| 8,532,827 B2 | 9/2013 | Stefanski et al. |
| 8,536,998 B1 | 9/2013 | Siu et al. |
| 8,538,587 B2 | 9/2013 | Hess et al. |
| 8,539,369 B2 | 9/2013 | Haupt et al. |
| 8,539,567 B1 | 9/2013 | Logue et al. |
| 8,543,243 B2 | 9/2013 | Wallaert et al. |
| 8,544,285 B2 | 10/2013 | Stefanski et al. |
| 8,554,376 B1 | 10/2013 | Matsuoka et al. |

(56) References Cited

U.S. PATENT DOCUMENTS

| | | | |
|---|---|---|---|
| 8,556,188 B2 | 10/2013 | Steinberg | |
| 8,558,687 B2 | 10/2013 | Haupt et al. | |
| 8,564,400 B2 | 10/2013 | Grohman et al. | |
| 8,589,111 B2 | 11/2013 | Simons | |
| 8,594,850 B1 | 11/2013 | Gourlay et al. | |
| 8,596,550 B2 | 12/2013 | Steinberg et al. | |
| 8,600,556 B2 | 12/2013 | Nester et al. | |
| 8,600,561 B1 | 12/2013 | Modi et al. | |
| 8,606,374 B2 | 12/2013 | Fadell et al. | |
| 8,620,841 B1 | 12/2013 | Filson et al. | |
| 8,621,377 B2 | 12/2013 | D'Souza et al. | |
| 8,622,314 B2 | 1/2014 | Fisher et al. | |
| 8,627,127 B2 | 1/2014 | Mucignat et al. | |
| 8,630,740 B2 | 1/2014 | Matsuoka et al. | |
| 9,551,504 B2* | 1/2017 | Arensmeier | F24D 5/04 |
| 10,274,945 B2* | 4/2019 | Arensmeier | G05B 23/0262 |
| 2003/0109938 A1* | 6/2003 | Daum | H04L 12/2803 700/11 |
| 2005/0040247 A1* | 2/2005 | Pouchak | G05D 23/1905 236/44 C |
| 2005/0040248 A1* | 2/2005 | Wacker | G05D 23/1905 236/51 |
| 2005/0040250 A1* | 2/2005 | Wruck | F24F 11/30 236/51 |
| 2005/0222933 A1* | 10/2005 | Wesby | H04L 41/08 705/36 R |
| 2006/0129308 A1 | 6/2006 | Kates | |
| 2007/0095082 A1* | 5/2007 | Garrett | F24F 11/77 62/180 |
| 2007/0199040 A1 | 8/2007 | Kates | |
| 2007/0220187 A1 | 9/2007 | Kates | |
| 2008/0036594 A1 | 2/2008 | Kates | |
| 2008/0059833 A1* | 3/2008 | Harrod | G05B 23/0291 714/4.2 |
| 2008/0150768 A1 | 6/2008 | Lei et al. | |
| 2008/0244730 A1 | 10/2008 | Ha et al. | |
| 2008/0265804 A1 | 10/2008 | Ha et al. | |
| 2008/0266846 A1 | 10/2008 | Cheng et al. | |
| 2009/0002493 A1 | 1/2009 | Kates | |
| 2009/0055026 A1 | 2/2009 | Ha et al. | |
| 2009/0089886 A1 | 4/2009 | Cheng et al. | |
| 2009/0090115 A1* | 4/2009 | Boydstun | F24F 11/30 62/126 |
| 2009/0153336 A1 | 6/2009 | Kates | |
| 2009/0184810 A1 | 7/2009 | Kates | |
| 2009/0187357 A1 | 7/2009 | Ho et al. | |
| 2009/0241052 A1 | 9/2009 | Ha et al. | |
| 2009/0242651 A1 | 10/2009 | Ha et al. | |
| 2010/0012744 A1 | 1/2010 | Kates | |
| 2010/0076605 A1* | 3/2010 | Harrod | F24F 11/30 700/276 |
| 2010/0114382 A1 | 5/2010 | Ha et al. | |
| 2010/0206039 A1 | 8/2010 | Kates | |
| 2010/0238036 A1 | 9/2010 | Holcombe | |
| 2010/0271217 A1 | 10/2010 | Kates | |
| 2010/0282857 A1 | 11/2010 | Steinberg | |
| 2010/0289641 A1 | 11/2010 | Kates | |
| 2011/0025501 A1 | 2/2011 | Kates | |
| 2011/0045761 A1 | 2/2011 | Rolf et al. | |
| 2011/0050410 A1 | 3/2011 | Rezvani et al. | |
| 2011/0093217 A1 | 4/2011 | Kates | |
| 2011/0190910 A1 | 8/2011 | Lombard et al. | |
| 2012/0005590 A1 | 1/2012 | Lombard et al. | |
| 2012/0019388 A1 | 1/2012 | Kates | |
| 2012/0024969 A1 | 2/2012 | Kates | |
| 2012/0089269 A1 | 4/2012 | Weaver et al. | |
| 2012/0105229 A1 | 5/2012 | Kates | |
| 2012/0158350 A1 | 6/2012 | Steinberg | |
| 2012/0158903 A1 | 6/2012 | Falk et al. | |
| 2012/0228393 A1* | 9/2012 | Storm | F24F 11/0008 236/44 A |
| 2012/0232969 A1 | 9/2012 | Fadell et al. | |
| 2012/0248211 A1 | 10/2012 | Warren et al. | |
| 2012/0253527 A1 | 10/2012 | Hietala et al. | |
| 2012/0305661 A1 | 12/2012 | Malchiondo et al. | |
| 2012/0310961 A1 | 12/2012 | Callison et al. | |
| 2013/0018513 A1 | 1/2013 | Metselaar | |
| 2013/0024799 A1 | 1/2013 | Fadell et al. | |
| 2013/0099011 A1 | 4/2013 | Matsuoka et al. | |
| 2013/0117267 A1 | 5/2013 | Buryak et al. | |
| 2013/0144445 A1 | 6/2013 | Steinberg | |
| 2013/0178985 A1 | 7/2013 | Lombard et al. | |
| 2013/0178986 A1 | 7/2013 | Lombard et al. | |
| 2013/0197698 A1 | 8/2013 | Shah et al. | |
| 2013/0204440 A1 | 8/2013 | Fadell et al. | |
| 2013/0204441 A1 | 8/2013 | Sloo et al. | |
| 2013/0211783 A1 | 8/2013 | Fisher et al. | |
| 2013/0226502 A1 | 8/2013 | Steinberg | |
| 2013/0231785 A1 | 9/2013 | Steinberg | |
| 2013/0233933 A1 | 9/2013 | Dostmann | |
| 2013/0238140 A1 | 9/2013 | Malchiondo et al. | |
| 2013/0238143 A1 | 9/2013 | Steinberg et al. | |
| 2013/0241726 A1 | 9/2013 | Hunter et al. | |
| 2013/0255297 A1 | 10/2013 | Matsuoka et al. | |
| 2013/0263034 A1 | 10/2013 | Bruck et al. | |
| 2013/0268124 A1 | 10/2013 | Matsuoka et al. | |
| 2013/0268125 A1 | 10/2013 | Matsuoka | |
| 2013/0292481 A1 | 11/2013 | Filson et al. | |
| 2013/0313331 A1 | 11/2013 | Warren et al. | |
| 2013/0332306 A1 | 12/2013 | Fahmy et al. | |
| 2013/0338837 A1 | 12/2013 | Hublou et al. | |
| 2014/0005837 A1 | 1/2014 | Fadell et al. | |
| 2014/0009306 A1 | 1/2014 | Haupt et al. | |
| 2014/0074730 A1* | 3/2014 | Arensmeier | F24F 11/30 705/305 |
| 2015/0211757 A1* | 7/2015 | Mutchnik | F24F 11/30 454/256 |
| 2015/0233597 A1* | 8/2015 | Dempster | F24F 11/62 165/11.2 |
| 2016/0215996 A1* | 7/2016 | Blair | G08B 21/187 |
| 2016/0370026 A1* | 12/2016 | Denton | G05B 17/02 |
| 2016/0370799 A1* | 12/2016 | Denton | G05B 13/0265 |
| 2017/0102723 A1* | 4/2017 | Smith | H04L 12/6418 |
| 2017/0314797 A1* | 11/2017 | Blair | F24F 11/30 |
| 2019/0212025 A1* | 7/2019 | Martin | F24F 11/32 |
| 2019/0264939 A1* | 8/2019 | Atchison | F24F 11/38 |

OTHER PUBLICATIONS

Kucera, A.; Glos, P. and Pitner, T., "Fault Detection in Building Management System Networks", Sep. 25-27, 2013, 12th IFAC Conference on Programmable Devices and Embedded Systems. (Year: 2013).*

Bushby, S.T.; Castro, N.; Galler, M.A.; Park, C. and House, J.M., "NISTIR 6818, Using the Virtual Cybernetic Building Testbed and FDD Test Shell for FDD Tool Development", Oct. 2001, National Institute of Standards and Technology (NIST). (Year: 2001).*

Galler, M., "Fault Detection and Diagnostics for Commercial Heating, Ventilatiing and Air-Conditioning Systems", Oct. 17, 2011, National Institute of Standards and Technology (NIST). (Year: 2011).*

Portland Energy Conservation, Inc., and Battelle Northwest Division, "Methods for Automated and Continuous Commissioning of Building Systems", Apr. 2003, Air-Conditioning and Refrigeration Technology Institute, ARTI-21CR/610-30040-01. (Year: 2003).*

City of Toronto, "Standard Building Automation System (BAS) Specification", Dec. 2015, City of Toronto, Environment and Energy Division, Section 23 09 23. (Year: 2015).*

WO 2014/186748 A1, Nov. 20, 2014. (Year: 2014).*

Roth, R., "The Value of Remote Residential HVAC Monitoring and Diagnostics", Jun. 19, 2017, BNP Media. (Year: 2017).*

IEA Program for Energy Conservation in Buildings and Community Systems, Demonstrating Automated Fault Detection and Diagnosis Methods in Real Buildings, 2001, Espoo, Technical Research Centre of Finland. (Year: 2001).*

Ghimire et al., "Fault Diagnosis and Augmented Reality-based Troubleshooting of HVAC Systems", 2016, IEEE. (Year: 2016).*

Kevin Cavanaugh, "Benefit from modern remote-diagnostic and maintenance systems", Feb. 3, 2005, STAMATS Communications, Inc. (Year: 2005).*

(56) References Cited

OTHER PUBLICATIONS

Alsaleem et al., "HVAC System Cloud Based Diagnostics Model", 2014, International Refrigeration and Air Conditioning Conference. (Year: 2014).*

Alsaleem, F.; Abiprojo, R.; Arensmeier, J.; and Hemmelgarn, G., "HVAC System Cloud Based Diagnostics Model", Jul. 14-17, 2014, 15th International Refrigeration and Air Conditioning Conference at Purdue. (Year: 2014).*

* cited by examiner

HVAC SYSTEM INCLUDING SMART DIAGNOSTIC CAPABILITES

BACKGROUND

Field of the Disclosure

The present disclosure generally relates to a heating, ventilation and air conditioning (HVAC) system, and more particularly, to an HVAC system including smart diagnostic capabilities.

Description of the Related Art

HVAC systems which regulate environmental conditions within an enclosed area of a commercial building (or residential home) are known. Residential HVAC systems are typically controlled by a thermostat, e.g., a smart thermostat. With respect to commercial buildings, the HVAC systems are typically controlled by a building automation system (BAS) or HVAC equipment control system. The thermostat or BAS can also be used to control security, lighting, power, etc. of the building.

Conventional BASs and/or thermostats can be configured to monitor a status of connected HVAC peripherals (e.g., an indoor unit and/or an outdoor unit, or parts thereof) to determine if the HVAC peripherals are working properly (or if they are faulty).

Currently, diagnosis of HVAC faults can be determined once a fault is reported at or from the HVAC peripherals. These faults can be a result of faulty sensors, undesirable and extreme environmental conditions, communication loss (e.g., loss of connectivity between one or more of the HVAC peripherals, the thermostat or the BAS), etc. While some of the faults can be predicted prior to occurring through continuous monitoring of the various operating parameters (e.g., temperature, pressure, etc.) of the HVAC system, most of them cannot and can only be determined after their occurrence.

Some of the faults can be resolved through software (or firmware) provided in the thermostat, the BAS, the HVAC peripherals, and do not require on-field service by a technician, but some of the faults may require diagnostic tests that need to be conducted by the technician to determine a root cause of the fault. Typically, such diagnostic tests require the technician to be physically present at the location of the HVAC system, so that the diagnostic test can be performed and the root cause of the fault determined; sometimes a second visit by technician may be necessary if they are not equipped with the required equipment or lack the replacement parts to fix the cause of the fault.

While the aforementioned thermostats and/or BASs are suitable for providing a status of the peripheral components, such thermostats and/or BASs do not include smart diagnostic capabilities that would allow the thermostat and/or the BAS to perform a diagnostic test of the faulty HVAC peripherals, and subsequently notify a technician if their service is required.

SUMMARY

The present disclosure has been made to address the above problems and disadvantages, and to provide at least the advantages described below. Accordingly, an aspect of the present disclosure provides an HVAC system including a thermostat that is in operable communication with a server that is configured to perform a diagnostic test of one or more faulty peripheral components of the HVAC system, thereby providing the technician with the necessary information to correct the fault, prior to the technician arriving at the HVAC system location.

In accordance with an aspect of the present disclosure, there is provided a system configured for remote diagnostic analysis of a heating, ventilation and air condition (HVAC) system. The system includes a thermostat in operable communication with at least one peripheral component (which can be a part of one of an indoor unit and an outdoor unit of the HVAC system) of the HVAC system and configured to receive information relating to the at least one peripheral component and a server in operable communication with the thermostat for receiving and analyzing the information.

The server can analyze the received information using diagnostic test logic included in a module of the thermostat, or the server can analyze the received information using diagnostic test logic included in a module of the server.

The server can send a control signal to the thermostat to perform a diagnostic test of the at least one peripheral component, and when a result of the diagnostic test indicates that the at least one peripheral component is faulty, transmit a notification signal to a technician. The notification signal can include one of information relating to a root cause analysis of the faulty at least one peripheral component, probable solutions to correct the faulty at least one peripheral component, and equipment required to fix the faulty at least one peripheral component.

The server can perform a system lockout of the HVAC system when it is determined that there is a likelihood that continued operation of the faulty at least one peripheral component can cause damage to at least one other peripheral component of the HVAC system. When connectivity between the server and the thermostat is lost for a predetermined amount of time, a notification signal can be sent from the server to one of a user of the HVAC system and a technician.

The server can further be configured to communicate directly with the at least one peripheral component for receiving and analyzing the information, analyzing the received information using diagnostic test logic included in a module of the at least one peripheral component, sending a control signal to the at least one peripheral component to perform a diagnostic test thereof, and when a result of the diagnostic test indicates that the at least one peripheral component is faulty, transmitting a notification signal to a technician, and when connectivity between the server and the at least one peripheral component is lost for a predetermined amount of time, sending a notification signal to one of a user of the HVAC system and the technician.

In accordance with an aspect of the present disclosure, there is provided a method for remote diagnostic analysis of a heating, ventilation and air condition (HVAC) system. The method includes receiving, information relating to at least one peripheral component (which can be a part of one of an indoor unit and an outdoor unit of the HVAC system), at a thermostat in operable communication therewith and receiving and analyzing the information at a server in operable communication with the thermostat.

Analyzing the received information can include using diagnostic test logic included in a module of the thermostat, or analyzing the received information can include using diagnostic test logic included in a module of the server.

The method can include sending a control signal from the server to the thermostat to perform a diagnostic test of the at least one peripheral component, and when a result of the diagnostic test indicates that the at least one peripheral component is faulty, transmitting a notification signal to a technician. The notification signal can include one of information relating to a root cause analysis of the faulty at least one peripheral component, probable solutions to correct the faulty at least one peripheral component, and equipment required to fix the faulty at least one peripheral component.

The method can include performing, by the server, a system lockout of the HVAC system when it is determined that there is a likelihood that continued operation of the faulty at least one peripheral component can cause damage to at least one other peripheral component of the HVAC system.

The method can include, when connectivity between the server and the thermostat is lost for a predetermined amount of time, sending a notification signal from the server to one of a user of the HVAC system and a technician.

The method can include, when the server is configured to communicate directly with the at least one peripheral component, analyzing the received information using diagnostic test logic included in a module of the at least one peripheral component, sending a control signal to the at least one peripheral component to perform a diagnostic test thereof, and when a result of the diagnostic test indicates that the at least one peripheral component is faulty, transmitting a notification signal to a technician, and when connectivity between the server and the at least one peripheral component is lost for a predetermined amount of time, sending a notification signal to one of a user of the HVAC system and the technician.

In accordance with an aspect of the present disclosure, there is provided a building automation system (BAS) for controlling a heating, ventilation and air condition (HVAC) system. The BAS includes a controller in operable communication with at least one peripheral component of the HVAC system and configured to receive information relating to the at least one peripheral component and a server in operable communication with the controller for receiving and analyzing the information. The server can analyze the received information using diagnostic test logic included in a module of the controller, or the server can analyze the received information using diagnostic test logic included in a module of the server.

The server can send a control signal to the controller to perform a diagnostic test of the at least one peripheral component, and when a result of the diagnostic test indicates that the at least one peripheral component is faulty, transmit a notification signal to a technician. The notification signal can include one of information relating to a root cause analysis of the faulty at least one peripheral component, probable solutions to correct the faulty at least one peripheral component, and equipment required to fix the faulty at least one peripheral component.

The server can perform a system lockout of the HVAC system when it is determined that there is a likelihood that continued operation of the faulty at least one peripheral component can cause damage to at least one other peripheral component of the HVAC system.

When connectivity between the server and the controller is lost for a predetermined amount of time, a notification signal can be sent from the server to one of a user of the HVAC system and a technician.

The server can further be configured to communicate directly with the at least one peripheral component for receiving and analyzing the information, analyzing the received information using diagnostic test logic included in a module of the at least one peripheral component, sending a control signal to the at least one peripheral component to perform a diagnostic test thereof, and when a result of the diagnostic test indicates that the at least one peripheral component is faulty, transmitting a notification signal to a technician, and when connectivity between the server and the at least one peripheral component is lost for a predetermined amount of time, sending a notification signal to one of a user of the HVAC system and the technician.

BRIEF DESCRIPTION OF THE DRAWINGS

The embodiments of the present invention may be more completely understood in consideration of the following detailed description of various embodiments in connection with the accompanying drawings, in which.

Figure 1:
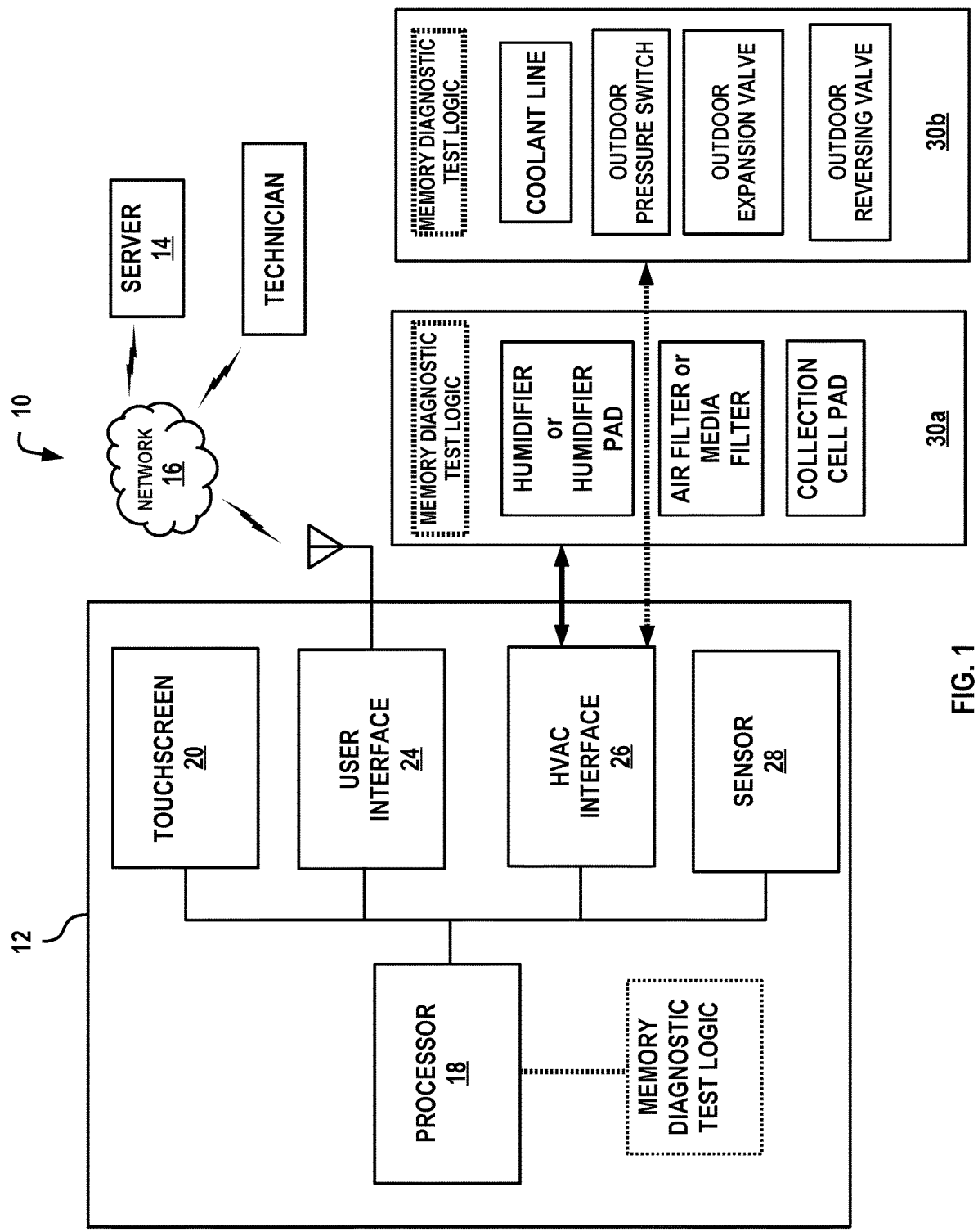
FIG. 1 is a diagram of a system including a thermostat, according to an embodiment of the present disclosure.

The various aspects of the present disclosure mentioned above are described in further detail with reference to the aforementioned figures and the following detailed description of embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in any appropriately detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. It should be appreciated that the particular implementations described herein are illustrative of the disclosure and its best mode and are not intended to otherwise limit the scope of the present disclosure in any way. One skilled in the art will also appreciate that, for security reasons, any element of the present disclosure may consist of any combination of databases or components at a single location or at multiple locations, wherein each database or system includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

The systems and methods of the invention can be utilized in a residential, local or widely distributed HVAC system, from a single family unit or building to an enterprise level, encompassing virtually any structure, cluster, campus, and areas therebetween. Systems and methods for residential and commercial HVAC control are disclosed in U.S. patent application Ser. No. 11/208,773, now U.S. Pat. No. 8,050, 801, filed Aug. 22, 2005, entitled "Dynamically Extensible and Automatically Configurable Building Automation System and Architecture" and U.S. patent application Ser. No. 15/186,715 (U.S. Patent Publication No. 2016/0370023), filed Jun. 20, 2016, entitled "Fault Detection and Diagnostics System Utilizing Service Personal Feedback for Improved Accuracy," both of which are assigned to the assignee of the present application, and are herein incorporated by reference.

As noted above, smart thermostats and/or BASs do not include smart diagnostic capabilities that would allow the thermostat and/or the BAS to perform a diagnostic test of the faulty HVAC peripherals, and subsequently notify a technician if their service is required. Accordingly, an HVAC system including a thermostat (or an HVAC system that is controlled by a BAS) with smart diagnostic capabilities is now herein described. For illustrative purposes, the aspects of the present disclosure will be described herein with reference to a thermostat.

FIG. 1 is a diagram of a system 10 including a thermostat 12 that is in operable communication with a server 14 (or portal, e.g., the NEXIA® server portal) via a network 16, according to an exemplary embodiment of the present disclosure. The server 14 also communicates with a technician (and/or a manufacturer, dealer, etc.) authorized to service an HVAC system that is controlled by the thermostat 12 via the network 16.

The thermostat 12 includes a processor 18 (or controller), a touch screen 20, a memory 22, a user interface (UI) 24, an HVAC interface 26, and a sensor 28, which monitors one or more peripheral components of an indoor unit 30a and/or outdoor unit 30b of the HVAC system, as will be described in greater detail below.

When the processor 18 is a component of a BAS (e.g., used with an HVAC system operable in a commercial environment), the processor 18 controls the overall operation of the HVAC system and can communicate, via a wired or wireless interface, with the components of the HVAC system. For example, the processor 18 can communicate with the components of the HVAC system using a wireless communication protocol including, without limitation, any variant of IEEE 802.11 (commonly known as WiFi), variants of IEEE 802.15 wireless personal area networking such as Bluetooth® and ZWave®, and other wireless standards such as ZigBee® or the AirFi™ protocol promulgated by Trane International Inc. of Davidson, N.C., USA. Alternatively, the processor 18 can be configured to communicate using a wired protocol using dedicated data lines (e.g., Ethernet), via powerline communication links using, for example, IEEE 1901 and/or X10®, or via a dual-band (wireless plus powerline) protocol such as the Insteon® protocol.

Likewise, when the processor 18 is a component of an HVAC system used in a residential environment, the processor 18 can control the overall operation of the HVAC system, via the HVAC interface 26, and can be configured for communication with the one or more peripheral components via the network 16 (which may include a LAN and/or the public internet). The HVAC interface 26 may be configured to communicate between thermostat 12 and the one or more peripheral components using any communications protocol suitable for use with the system. For example, and without limitation, where the indoor unit 30a, the outdoor unit 30b, and/or furnaces (not explicitly shown) employ single- or dual-speed motors, HVAC interface 26 may include a 24V switched circuit interface which operates with well-known HVAC color-coded wiring schemes (Rc, Rh, C, Y, W, Y2, W2, G, E, O, V, etc.). Where the indoor unit 30a and/or outdoor unit 30b employ variable-speed motors, HVAC interface 26 may include a digital signaling interface such as, without limitation, CANbus, RS-485, ComfortLink II™, ClimateTalk™, and the like. In embodiments, HVAC interface 26 may operate using both 24V switched circuits and digital signaling protocols to flexibly accommodate any combination of HVAC equipment. In embodiments, any of the functions of data interface 14 may be performed by HVAC interface 26, and vice versa. In embodiments, HVAC interface 26 may be incorporated within data interface 14.

Additionally or alternatively, the processor 18 can be configured for communication with one or more remote devices that are in operable communication with the HVAC system via network 16 (which may include a LAN and/or the public internet). The remote device may include, without limitation, a mobile device (smart phone, tablet computer, and the like) and/or the remote server 14 (such as a dealer diagnostic portal, a fuel marketplace server, a weather data provider, other data providers, and so forth). Furthermore, the processor 18 can be configured to communicate using a wide area cellular mobile network using, for example and without limitation, a GSM protocol (3G, 4G, LTE etc.), a CDMA protocol (EV-DO, SV-DO, etc.), and so forth.

The processor 18 can include a data interface module (not shown), which can function as a WiFi/AirFi™ hot-spot or wired router to enable the processor 18 and/or the components of the HVAC system (e.g., the thermostat 12) or other components (e.g., one or more smart devices including, without limitation, a smart watch, a smart phone, a smart tablet, smart remote, etc.) in operative communication with the processor 18 to connect to the network 16 (or the Internet).

The touch screen 20, under the control of the processor 18 and in conjunction with the user interface 24, can display one or more graphical user interfaces (GUIs) when a fault is detected in the indoor unit 30a and/or outdoor unit 30b by the thermostat 12. For example, the touch screen 20 can display a GUI 25, which indicates to a user that the fault has been detected, that the server is performing a diagnostic test, the determined faulty peripheral component, and that a notification has been sent to dispatch a technician has (see FIG. 2, for example). As can be appreciated, other information can also be provided in the GUI 25 (and/or other GUIs (not shown) can also be used to provide additional information). For example, prior to sending the notification, the GUI 25 (or another GUI) can be displayed requesting confirmation as to whether the notification should be sent to the technician, e.g., when the fault can be fixed by the thermostat 12, the server 14, or a user.

The HVAC interface 26, under the control of the processor 18 and in conjunction with the sensor 28, can monitor a status of the indoor unit 30a and/or the outdoor unit 30b including the one or more peripheral components associated therewith. Some peripheral components of the indoor unit 30b can include, without limitation, a humidifier, a humidifier pad, an air filter, media filter, a collection cell pad, a filter screen, etc. Some peripheral components of the outdoor unit 30b can include, without limitation, a coolant line, an outdoor pressure switch, an outdoor expansion valve, an outdoor reversing valve, and so forth.

The peripheral components, when faulty, can cause either or both of the indoor unit 30a and the outdoor unit 30b to function improperly. For example, a fault condition, e.g., a low pressure on the outdoor unit 30b (e.g., an air conditioner or a heat pump unit) can be a result of low refrigerant charge, faulty outdoor pressure switch(es), faulty outdoor expansion valve, faulty outdoor reversing valve, or faulty outdoor compressor.

Figure 3:
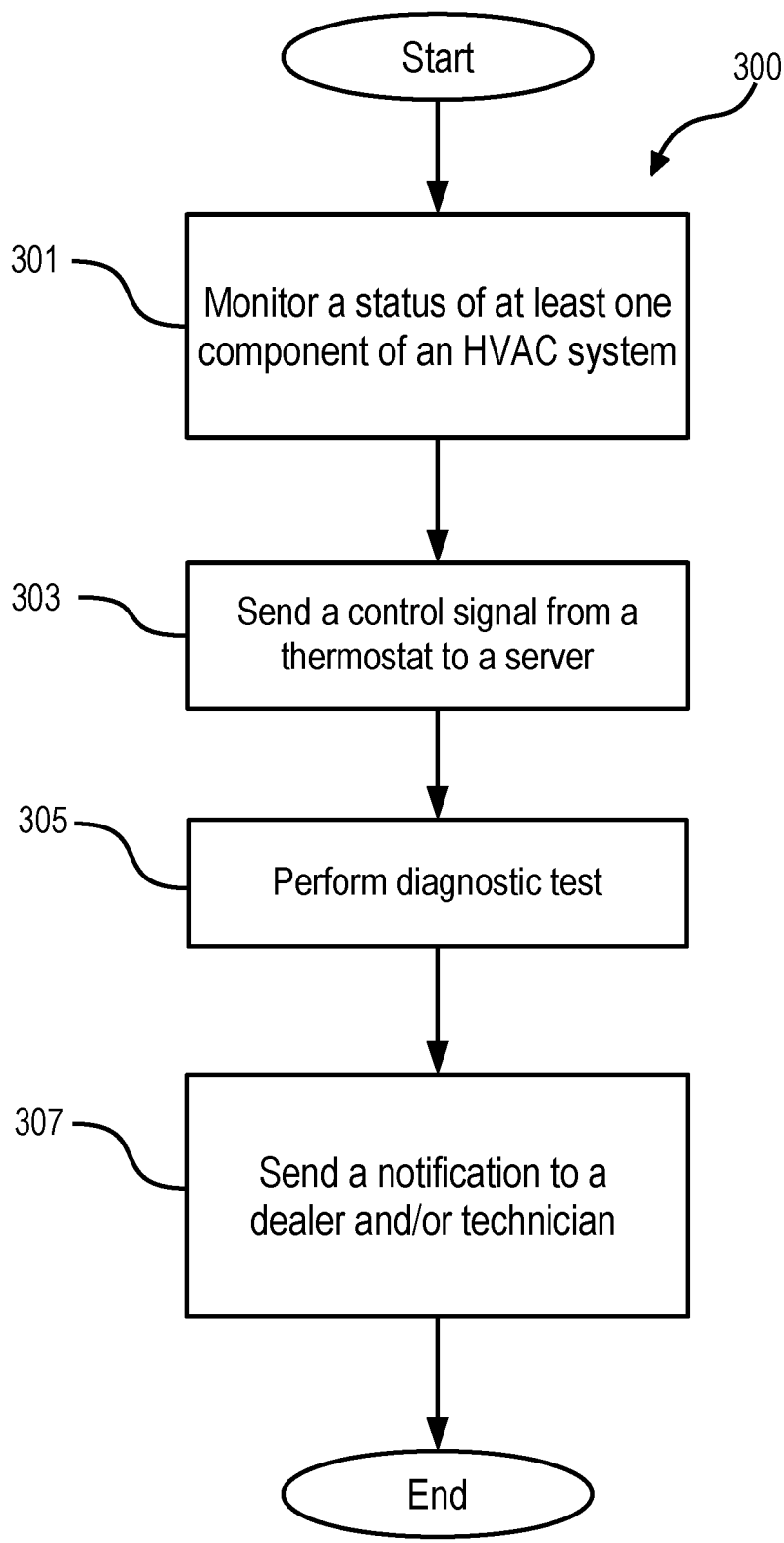
FIG. 3 is a flowchart of a method for remote diagnostic analysis of an HVAC system, according to an embodiment of the present disclosure.

FIG. 3 is a flowchart of a method 300 for remote diagnostic analysis of the HVAC system, according to an embodiment of the present disclosure.

At step 301, under the control of the processor 18, the HVAC interface 26 and sensor 28 of the thermostat 12 can monitor one more of the previously described peripheral components of the HVAC system, using various monitoring techniques. For example, it may be determined that there is low pressure in the outdoor unit 30b, a root cause of which cannot be determined at the thermostat 12.

Figure 2:
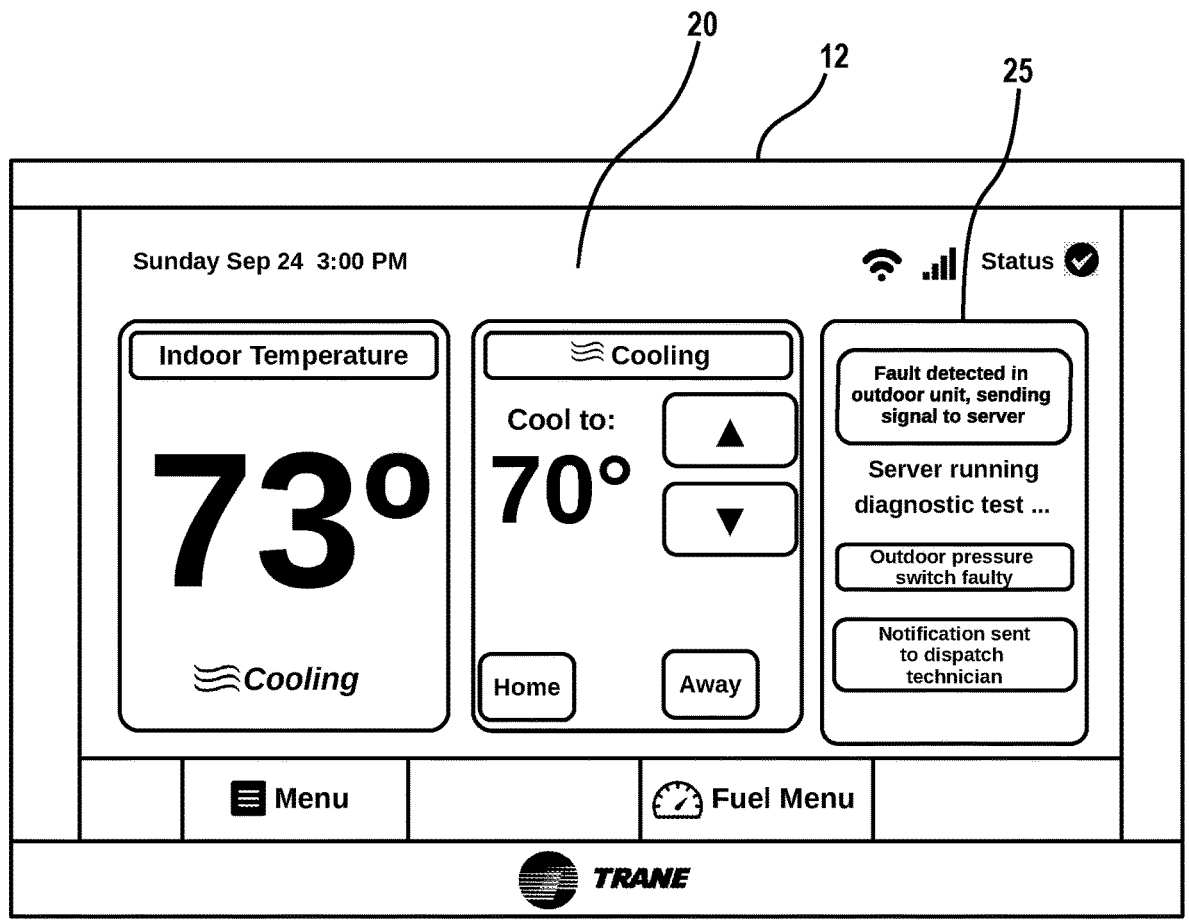
FIG. 2 is a diagram of a graphical user interface displayed on the thermostat of FIG. 1.

At step 303, a control signal including the information relating to the detected fault in the outdoor unit 30b can be transmitted from the thermostat 12 to the server 14, and an indication of the fault can also be displayed in the GUI 25 (FIG. 2). The information can include, for example, a pressure of the coolant line, a voltage or a current reading at test points associated with a particular peripheral component, air flow through a filter, age of the peripheral components, etc.

The server 14 can run a diagnostic test to determine the root cause of the low pressure in the outdoor unit 30b at step 305, and an indication that the diagnostic test is being performed can be displayed in the GUI 25 (FIG. 2). The server 14 can analyze the detected fault in the outdoor unit 30b using diagnostic test logic included in a module of the thermostat 12, e.g., in a memory of the thermostat 12 (or included in a module of the outdoor unit 30b). Alternatively, the server 14 can analyze the detected fault in the outdoor unit 30b using diagnostic test logic included in a module (not shown) of the server 14.

If the server 14 determines that the root cause of the fault can be fixed by a user, the server 14 can transmit the information needed to correct the root cause of the fault to the thermostat 12, which, in turn, can display the information on the GUI 25 to the user. For example, if the detected fault was low air flow, and it was determined by the server 14 that the root cause was caused by a clogged air filter, the thermostat 12 could display the cause of the fault (e.g., "clogged air filter") in the GUI 25 to the user.

Conversely, if the server 14 determines that the root cause of the fault cannot be fixed by the user (e.g., a faulty outdoor expansion valve in the outdoor unit 30b), the server 14 can send a command signal to the thermostat 12 informing of the root cause of the fault, and an indication of the fault can also be displayed in the GUI 25 (FIG. 2). Thereafter, at step 307 the server 14 can send a notification to have a technician dispatched to fix or replace the faulty component, e.g., the outdoor expansion valve. The notification can be sent directly to a technician that is listed in memory of the thermostat 12 (or listed in a memory of the server 14), or the notification can be sent to an authorized dealer, who can then dispatch the technician.

The notification signal sent to the technician (or dealer) can include information relating to a root cause analysis of the faulty peripheral component, probable solutions to correct the faulty peripheral component, and equipment (e.g., outdoor pressure switch) required to fix (or replace) the faulty peripheral component.

In embodiments, the server 14 can perform a system lockout of the HVAC system when it is determined that there is a likelihood that continued operation of the faulty peripheral component can cause damage to other peripheral components (e.g., components directly connected to the faulty peripheral component) of the HVAC system or the HVAC system itself. For example, if it is determined that the root cause of a fault is a leak in a coolant line in either the indoor unit 30a or the outdoor unit 30b, the server 14 can send a lockout signal to the thermostat 12. The lockout can be a total lockout, which, in turn, can shut down (e.g., remove power from) the HVAC system. In other instances, a partial lockout may be employed which shuts down affected components while permitting other components to continue operating. The partial lockout mode enables the system to operate with reduced functionality while preventing cascading failures. For example, during a "low refrigerant pressure" condition, the partial lockout could disable the compressor and outdoor fan, yet allow the indoor circulator fan to continue operating to provide some comfort to occupants.

Moreover, if it is determined that connectivity between the server 14 and the thermostat 12 is lost for a predetermined amount of time, a notification signal can be sent from the server 14 to the user of the HVAC system and/or the technician (and/or dealer).

In accordance with an exemplary embodiment of the present disclosure, the system 10 including the thermostat 12 (or a controller of the BAS) allows the server 14 to perform a remote diagnostic test on one or more peripheral components of the HVAC system 10 for determining a root cause of a fault associated therewith. Accordingly, unnecessary service calls to a technician can be reduced (or eliminated) when the root cause of a fault can be fixed by a user and/or the server 14, thereby reducing the overall operating costs of the HVAC system. Additionally, a technician that is dispatched to fix a faulty peripheral component will already be provided with important information that can assist the technician with fixing the faulty peripheral component, such as, for example, specific repair procedures, a list of any required tools and test equipment, and a list replacement parts that are likely to be needed.

From the foregoing and with reference to the various Figures, those skilled in the art will appreciate that certain modifications can also be made to the present disclosure without departing from the scope of the same. For example, while it has been described herein that the thermostat 12 monitors the one or more peripheral components of the HVAC system, the present disclosure is not so limited. For example, in embodiments, the server 14 can be in direct communication with the indoor unit 30a and/or outdoor unit 30b (and/or the peripheral components associated therewith) via one or more the aforementioned wired or wireless interfaces.

In such an embodiment, the server 14 can directly monitor the indoor unit 30a and/or outdoor unit 30b and directly receive the information relating to the faulty peripheral component of the indoor unit 30a and/or the outdoor unit 30b, and can analyze the information using diagnostic test logic included in a module of the peripheral component. The server 14 can send a control signal to the peripheral component to perform a diagnostic test thereof, and when a result of the diagnostic test indicates that the peripheral component is faulty, the server 14 can transmit a notification signal to the technician, in a manner as described above.

ASPECTS

It is noted that any of aspects 1-27 may be combined with each other in any suitable combination.

Aspect 1. A system configured for remote diagnostic analysis of a heating, ventilation and air condition (HVAC) system, the system comprising: a thermostat in operable communication with at least one peripheral component of the HVAC system and configured to receive information relating to the at least one peripheral component; and a server in operable communication with the thermostat for receiving and analyzing the information.

Aspect 2. The system according to aspect 1, wherein the server analyzes the received information using diagnostic test logic included in a module of the thermostat.

Aspect 3. The system according to aspect 1 or 2, wherein the server analyzes the received information using diagnostic test logic included in a module of the server.

Aspect 4. The system according to any of aspects 1-3, wherein the server sends a control signal to the thermostat to perform a diagnostic test of the at least one peripheral component, and when a result of the diagnostic test indicates that the at least one peripheral component is faulty, transmitting a notification signal to a technician.

Aspect 5. The system according to any of aspects 1-4, wherein the notification signal includes one of information relating to a root cause analysis of the faulty at least one peripheral component, probable solutions to correct the faulty at least one peripheral component, and equipment required to fix the faulty at least one peripheral component.

Aspect 6. The system according to any of aspects 1-5, wherein the server performs a system lockout of the HVAC system when it is determined that there is a likelihood that continued operation of the faulty at least one peripheral component can cause damage to at least one other peripheral component of the HVAC system.

Aspect 7. The system according to any of aspects 1-6, wherein when connectivity between the server and the thermostat is lost for a predetermined amount of time, a notification signal is sent from the server to one of a user of the HVAC system and a technician.

Aspect 8. The system according to any of aspects 1-7, wherein the server is further configured to communicate directly with the at least one peripheral component for: receiving and analyzing the information; analyzing the received information using diagnostic test logic included in a module of the at least one peripheral component; sending a control signal to the at least one peripheral component to perform a diagnostic test thereof, and when a result of the diagnostic test indicates that the at least one peripheral component is faulty, transmitting a notification signal to a technician; and when connectivity between the server and the at least one peripheral component is lost for a predetermined amount of time, sending a notification signal to one of a user of the HVAC system and the technician.

Aspect 9. The system according to any of aspects 1-8, wherein the at least one peripheral component is a part of one of an indoor unit and an outdoor unit of the HVAC system.

Aspect 10. A method for remote diagnostic analysis of a heating, ventilation and air condition (HVAC) system, the method comprising: receiving, information relating to at least one peripheral component, at a thermostat in operable communication therewith; and receiving and analyzing the information at a server in operable communication with the thermostat.

Aspect 11. The method according to aspect 10, wherein analyzing the received information includes using diagnostic test logic included in a module of the thermostat.

Aspect 12. The method according to aspect 10 or 11, wherein analyzing the received information includes using diagnostic test logic included in a module of the server.

Aspect 13. The method according to any of aspects 10-12, further comprising sending a control signal from the server to the thermostat to perform a diagnostic test of the at least one peripheral component, and when a result of the diagnostic test indicates that the at least one peripheral component is faulty, transmitting a notification signal to a technician.

Aspect 14. The method according to any of aspects 10-13, wherein the notification signal includes one of information relating to a root cause analysis of the faulty at least one peripheral component, probable solutions to correct the faulty at least one peripheral component, and equipment required to fix the faulty at least one peripheral component.

Aspect 15. The method according to any of aspects 10-14, further comprising performing, by the server, a system lockout of the HVAC system when it is determined that there is a likelihood that continued operation of the faulty at least one peripheral component can cause damage to at least one other peripheral component of the HVAC system.

Aspect 16. The method according to any of aspects 10-15, further comprising, when connectivity between the server and the thermostat is lost for a predetermined amount of time, sending a notification signal from the server to one of a user of the HVAC system and a technician.

Aspect 17. The method according to any of aspects 10-16, further comprising, when the server is configured to communicate directly with the at least one peripheral component: analyzing the received information using diagnostic test logic included in a module of the at least one peripheral component; sending a control signal to the at least one peripheral component to perform a diagnostic test thereof, and when a result of the diagnostic test indicates that the at least one peripheral component is faulty, transmitting a notification signal to a technician; and when connectivity between the server and the at least one peripheral component is lost for a predetermined amount of time, sending a notification signal to one of a user of the HVAC system and the technician.

Aspect 18. The method according to any of aspects 10-17, wherein the at least one peripheral component is a part of one of an indoor unit and an outdoor unit of the HVAC system.

Aspect 19. A building automation system (BAS) for controlling a heating, ventilation and air condition (HVAC) system, the BAS comprising: a controller in operable communication with at least one peripheral component of the HVAC system and configured to receive information relating to the at least one peripheral component; and a server in operable communication with the controller for receiving and analyzing the information.

Aspect 20. The BAS of according to aspect 19, wherein the server analyzes the received information using diagnostic test logic included in a module of the controller.

Aspect 21. The BAS according to aspect 19 or 20, wherein the server analyzes the received information using diagnostic test logic included in a module of the server.

Aspect 22. The BAS according to any of aspects 19-21, wherein the server sends a control signal to the controller to perform a diagnostic test of the at least one peripheral component, and when a result of the diagnostic test indicates that the at least one peripheral component is faulty, transmitting a notification signal to a technician.

Aspect 23. The BAS according to any of aspects 19-22, wherein the notification signal includes one of information relating to a root cause analysis of the faulty at least one peripheral component, probable solutions to correct the faulty at least one peripheral component, and equipment required to fix the faulty at least one peripheral component.

Aspect 24. The BAS according to any of aspects 19-23, wherein the server performs a system lockout of the HVAC system when it is determined that there is a likelihood that continued operation of the faulty at least one peripheral component can cause damage to at least one other peripheral component of the HVAC system.

Aspect 25. The BAS according to any of aspects 19-24, wherein when connectivity between the server and the controller is lost for a predetermined amount of time, a notification signal is sent from the server to one of a user of the HVAC system and a technician.

Aspect 26. The BAS according to any of aspects 19-25, wherein the server is further configured to communicate directly with the at least one peripheral component for: receiving and analyzing the information; analyzing the received information using diagnostic test logic included in a module of the at least one peripheral component; sending a control signal to the at least one peripheral component to perform a diagnostic test thereof, and when a result of the diagnostic test indicates that the at least one peripheral component is faulty, transmitting a notification signal to a technician; and when connectivity between the server and the at least one peripheral component is lost for a predetermined amount of time, sending a notification signal to one of a user of the HVAC system and the technician.

Aspect 27. The BAS according to any of aspects 19-26, wherein the at least one peripheral component is a part of one of an indoor unit and an outdoor unit of the HVAC system.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A system configured for remote diagnostic analysis of a heating, ventilation and air condition (HVAC) system, the system comprising:
    a thermostat in operable communication with at least one peripheral component of the HVAC system, wherein the thermostat is configured to receive information relating to the at least one peripheral component and to forward the information to a server; and
    the server configured to:
        analyze the information;
        based on the information, determine that the at least one peripheral component exhibits a fault condition; and
        perform a fault classification procedure that classifies the fault condition based on a determination of whether a remedy to the fault condition is likely without a service technician,
            wherein the fault classification procedure includes sending a control signal to the thermostat to perform a diagnostic test of the at least one peripheral component, and when a result of the diagnostic test indicates that the fault condition is determined to be unlikely to be remedied without the service technician, transmitting a notification signal to the service technician,
        wherein the server performs a system lockout of the HVAC system when it is determined that there is a likelihood that continued operation of the faulty at least one peripheral component can cause damage to at least one other peripheral component of the HVAC system.

2. The system of claim 1, wherein the server analyzes the received information using diagnostic test logic included in a module of the thermostat.

3. The system of claim 1, wherein the server analyzes the received information using diagnostic test logic included in a module of the server.

4. The system of claim 1, wherein the notification signal includes one of information relating to a root cause analysis of the fault condition, probable solutions to correct the fault condition, and equipment required to remedy the fault condition.

5. The system of claim 1, wherein when connectivity between the server and the thermostat is lost for a predetermined amount of time, a notification signal is sent from the server to one of a user of the HVAC system and a technician.

6. The system of claim 1, wherein the server is further configured to communicate directly with the at least one peripheral component for:
    receiving and analyzing the information;
    analyzing the received information using diagnostic test logic included in a module of the at least one peripheral component;
    sending a control signal to the at least one peripheral component to perform a diagnostic test thereof, and when a result of the diagnostic test indicates that the at least one peripheral component is faulty, transmitting a notification signal to a technician; and
    when connectivity between the server and the at least one peripheral component is lost for a predetermined amount of time, sending a notification signal to one of a user of the HVAC system and the technician.

7. The system of claim 1, wherein the at least one peripheral component is a part of one of an indoor unit and an outdoor unit of the HVAC system.

8. A method for remote diagnostic analysis of a heating, ventilation and air condition (HVAC) system, the method comprising:
    receiving, information relating to at least one peripheral component, at a building automation system controller in operable communication therewith;
    transmitting the information to a server in operable communication with the building automation system controller;
    based on the information, determining, at the server, that the at least one peripheral component has a fault condition; and based on a type of the fault condition, determining, at the server, whether a remedy to the fault condition is likely without a technician,
        wherein the determining includes
            sending a control signal from the server to the building automation system controller to perform a diagnostic test of the at least one peripheral component, and when a result of the diagnostic test indicates that the at least one peripheral component is faulty and that the fault condition is determined to be unlikely to be remedied without the technician, transmitting a notification signal to the technician, and performing, by the server, a system lockout of the HVAC system when it is determined that there is a likelihood that continued operation of the faulty at least one peripheral component can cause damage to at least one other peripheral component of the HVAC system.

9. The method of claim 8, wherein the determining that the at least one peripheral component has a fault condition includes using diagnostic test logic included in a module of the building automation system controller.

10. The method of claim 8, wherein the determining that the at least one peripheral component has a fault condition includes using diagnostic test logic included in a module of the server.

11. The method of claim 8, wherein the notification signal includes one of information relating to a root cause analysis of the fault condition, probable solutions to correct the fault condition, and equipment required to fix the fault condition.

12. The method of claim 8, further comprising, when connectivity between the server and the building automation system controller is lost for a predetermined amount of time, sending a notification signal from the server to one of a user of the HVAC system and a technician.

13. The method of claim 8, further comprising, when the server is configured to communicate directly with the at least one peripheral component:
  analyzing the received information using diagnostic test logic included in a module of the at least one peripheral component;
  sending a control signal to the at least one peripheral component to perform a diagnostic test thereof, and when a result of the diagnostic test indicates that the at least one peripheral component is faulty, transmitting a notification signal to a technician; and
  when connectivity between the server and the at least one peripheral component is lost for a predetermined amount of time, sending a notification signal to one of a user of the HVAC system and the technician.

14. The method of claim 8, wherein the at least one peripheral component is a part of one of an indoor unit and an outdoor unit of the HVAC system.

15. The method of claim 8, wherein the building automation system controller comprises a thermostat.

16. A building automation system (BAS) for controlling a heating, ventilation and air condition (HVAC) system, the BAS comprising:
  a controller in operable communication with at least one peripheral component of the HVAC system, wherein the controller is configured to receive information relating to the at least one peripheral component and to forward the information to a server; and
  the server configured to:
    analyze the information;
    based on the information, determine that the at least one peripheral component exhibits a fault condition; and
    perform a fault classification procedure that classifies the fault condition based on a determination of whether a remedy to the fault condition is likely without a service technician,
      wherein the fault classification procedure includes sending a control signal to the controller to perform a diagnostic test of the at least one peripheral component, and when a result of the diagnostic test indicates that the fault condition is exhibited and the fault condition is determined to be unlikely to be remedied without the service technician, transmitting a notification signal to the service technician,
      wherein the server performs a system lockout of the HVAC system when it is determined that there is a likelihood that continued operation of the faulty at least one peripheral component can cause damage to at least one other peripheral component of the HVAC system.

17. The BAS of claim 16, wherein the server analyzes the received information using diagnostic test logic included in a module of the controller.

18. The BAS of claim 16, wherein the server analyzes the received information using diagnostic test logic included in a module of the server.

19. The BAS of claim 16, wherein the notification signal includes one of information relating to a root cause analysis of the fault condition, probable solutions to correct the fault condition, and equipment required to fix the fault condition.

20. The BAS of claim 16, wherein when connectivity between the server and the controller is lost for a predetermined amount of time, a notification signal is sent from the server to one of a user of the HVAC system and a technician.

21. The BAS of claim 16, wherein the server is further configured to communicate directly with the at least one peripheral component for:
  receiving and analyzing the information;
  analyzing the received information using diagnostic test logic included in a module of the at least one peripheral component;
  sending a control signal to the at least one peripheral component to perform a diagnostic test thereof, and when a result of the diagnostic test indicates that the at least one peripheral component is faulty, transmitting a notification signal to a technician; and
  when connectivity between the server and the at least one peripheral component is lost for a predetermined amount of time, sending a notification signal to one of a user of the HVAC system and the technician.

22. The BAS of claim 16, wherein the at least one peripheral component is a part of one of an indoor unit and an outdoor unit of the HVAC system.

* * * * *